Patented Mar. 9, 1926.                                                              1,575,957

UNITED STATES PATENT OFFICE.

JOSEPH HAY AMIES, OF PHILADELPHIA, PENNSYLVANIA.

COMPOSITION FOR HIGHWAY SURFACING AND THE LIKE.

No Drawing.              Application filed March 4, 1924. Serial No. 696,908.

*To all whom it may concern:*

Be it known that I, JOSEPH HAY AMIES, a citizen of the United States of America, residing at Philadelphia, in the county of Philadelphia, State of Pennsylvania, have invented a new and useful Composition for Highway Surfacing and the like, of which the following is a specification.

One object of my invention is to effect an improvement in the endurance and decrease in the cost of building and maintenance of highways and street wearing surfaces. Other objects will appear hereafter.

These compositions may be used for other utilities such as flooring, sidewalk paving, roofing and the like.

The compositions contemplated in this improvement are generally called "bituminous and sand sheet asphalt concretes."

In the manufacture of these, several almost unsurmountable difficulties present themselves. Perhaps the greatest of these difficulties is owing to the presence of the surface and inherent moisture of the mineral materials employed. As long as these moistures remain the bituminous binder will sooner or later strip from the mineral materials, because by abrasion thereof, moisture finds access to their surfaces, and it is therefore very difficult to coat the same permanently with any bituminous liquid, whether it is in a hot or cold condition.

To overcome this difficulty resort has been had to the heating of the mineral material with the expectation that the inherent moisture can be thus exhausted and whilst this attempt is very old in practice, it has always been a failure and this failure always manifests itself sooner or later by the bituminous binder stripping from the mineral materials and in the instance of sheet sand asphalt, from the grains of the sand employed as a filler. For a short time after bituminous concrete and the sand sheet asphalts are made, the bituminous binder may indifferently cling to the granular particles and bind them loosely together, but under a short period of wear, the binder, (owing to the fact of the inherent moisture of the mineral materials working to the surface), will invariably strip off and fall away therefrom.

The heating of the mineral materials, in the attempt to exhaust the inherent moisture, and to dry the surfaces thereof, causes an expense of about thirty three and one-third (33⅓%) per cent of the total cost of manufacturing the bituminous concrete and sheet sand asphalt compositions. This expense is an entire waste, and in fact, it is more than a waste, because this detriment effects a very early destruction of the wearing surface, compelling, in addition to the said waste, frequent, costly resurfacing.

Moreover, the heat applied to the mineral materials, in order to eliminate the inherent moisture, must be so great as to seriously injure their integrity. The inherent moisture is contained, hermetically, within the organic bodies of the mineral materials, in highly silicated infinitesimal cells, and in order to eliminate this moisture, these cells must be destroyed, by causing the inherent moisture contained therein, to become changed into superheated steam, which, by expansion, breaks open and thus destroys the said cells, thereby so weakening the resistances of the mineral materials, as to cause an early granulation of the composition, and this, in addition, to the above reasons, accounts largely for the impermanency of streets and highways. It is a well known and observed fact that after the mineral materials and sand have been highly heated in preparation for receiving the bituminous binder, they immediately, when removed from contact with artificial heat, "sweat", that is, they will become quickly covered, on their outer surfaces, with a comparatively thick, hot, vaporous moisture, and this fact very largely defeats the very purposes for which the heating of the mineral materials and sand is practiced.

My improvement literally and scientifically and with almost instantaneous rapidity, escapes these serious difficulties. I have made a number of experiments, under annotation of time, and have found that I can internally and externally dry the mineral materials and sand, in about ten seconds, after these materials have been placed within a mixing machine, or upon a float for hand manipulation.

My process is as follows:—I employ a standard gasoline "blower". The gasoline flame induced, operates by air pressure. This causes the flame to forcibly interpenetrate fine sand or finely sieved soil, placed within the "blower" or "sand heater". The cylinder that I employ will be one of the smaller sizes of said sand heaters, holding not more than nine to fifteen cubic feet of finely sieved soil or sand. This material must be raised to a heat approximating two thousand (2000) degrees F. An equal quantity of cold damp material must replace the quantity of hot material removed from the cylinder for every batch of the composition manufactured. Presuming that one cubic foot of the highly heated material shall be taken from the sand heater, this must be replaced at once with an equal measure of cold damp material which we may say associates with from eight to fourteen cubic feet of very hot material. This process considerably prolongs the endurance of the sand heater by preventing the cylinder from attaining a continuously increasing heat, at the same time producing an economical heating of the material by consuming the heat that for the foregoing reasons should be consumed. Of course, in the case of either soil or sand, this heat will disintegrate and char the said material but no particular harm is done in the manufacture of bituminous concrete or sheet sand asphalt thereby because these heated materials are simply used for fillers and serve no other purpose and are of no other consequence when residing within the manufactured compositions.

I have now placed in a mixing machine or on a float, from nine to fifteen cubic feet of mineral materials or sand. These materials are cold, possessing internal and surface moistures. I have previously taken ten to fifteen pounds of pulverized oxide of calcium, in a perfectly quick condition, and I have mixed therewith a small quantity of water at the boiling point. This causes the instantaneous slaking of the oxide of calcium. I now place the already slaking oxide of calcium and while in a slaking condition into the mixer which has already received from nine to fifteen cubic feet of mineral materials. These materials when saturated and surface dampened with water, will carry about one pound thereof to the ton of material whether of broken ston or a fine sharp sand. Ten to fifteen pounds of the oxide of calcium would take up and convert and throw off in the form of a wet steam from four to six pounds of water to the ton of said materials. I now add quickly, about one cubic foot of the very hot finely sieved soil or finely grained sand. The effect of this process will be that the oxide of calcium imperiously demanding moisture owing to the intense chemical reaction would convert partly, and partly throw off, in the form of wet steam, the surface moisture of the mineral materials and sand and in addition thereto converts the inherent moisture into a lime alumina silicate by what is presumed to be catalytic reaction, thereby increasing, in the case of the mineral material, and the finely grained sand the coefficiency of each, and in about ten seconds of time, the said mineral material or sand is sufficiently heated and dried to receive, and very tightly clasp to their individual bodies, the bituminous binder, which should be, preferably, added at a heat of about three hundered and forty (340) degrees F. In one minute's time, on an average, the mixer can be loaded and emptied, providing from ten to fifteen cubic feet of superior bituminous concrete or sand sheet asphalt. By the ordinary process it takes from three to four minutes to produce the same bulks of manufactured composition.

The effect of the oxide of calcium is to place the binder in a fixed, very tough, semi-fluid condition, in which condition, it is practically indifferent to the changes of temperature, and attains permanent age lasting endurance.

This mixture can be shown, by reference to other arts, to be the most scientific, and much lower in cost, as compared to any other type of bituminous or sheet sand asphalt compositions, and at a saving of from one dollar and fifty cents to two dollars per ton in manufacture and emplacement.

The manufacturing may take place at the roadside, and this is desirable, because, while in a heated state, it can be placed, upon a prepared foundation and rolled or otherwise compressed, more effectively, because the high heat present may be utilized in securing the increased density.

A great waste of time and expenditure may occur in the manufacture of compositions, because the operation must be suspended during any period of wet and rainy weather. Such weather may continue for days and even weeks at a time throwing labor out of employment and capital out of service. And not infrequently, highways in the process of building will be unduly suspended, cutting off all traffic thereover, thus causing great inconvenience and expense to travelers and for freight for a much longer time than would be necessary if my process would be employed. In my case, I can manufacture my compositions when exposed to heavy rain falls and it may be placed upon wet grades and foundations and cling thereto. These great results are procured by the effect of my application of slaking oxide of calcium in the process of manufacturing the said composition by the method herein disclosed.

My compositions nevertheless, may be manufactured and held in stock to be employed, without retreatment, at convenience, in larger or smaller quantities and placed and compressed when needed, because it maintains a permanently semi-fluid viscous condition until compressed as by tamping or rolling or any other method, to secure condensation.

Having in detail and clearly explained my method what I claim is:

The herein described process of manufacturing compositions for highway surfacing and the like, which consists, first, in placing soil (common earth) and mineral materials in a standard rotating heating cylinder and heating the same to about 2,000 degrees F. secondly, placing soil (common earth) and mineral materials in a standard mixing machine, or upon a float for ready hand manipulation, then, thirdly, placing thereupon from ten to fifteen pounds of the oxide of calcium in an already slaking condition to each ten to fifteen cubic feet batch quantity of the said soil and mineral materials, then adding from one to two cubic feet of the highly heated soil and mineral material, then adding about twelve per cent of the highly heated bituminous material whilst the oxide of calcium is slaking, all as particularly and in detail herein specified.

In testimony whereof I have hereunto signed my name.

JOSEPH HAY AMIES.